US007266049B1

(12) United States Patent
Suber, III et al.

(10) Patent No.: US 7,266,049 B1
(45) Date of Patent: Sep. 4, 2007

(54) CLOCK RADIO WITH INTEGRAL DIGITAL MUSIC STORAGE SYSTEM AND INFRARED INTERFACE

(76) Inventors: Edward Howard Suber, III, 1445 Virginia Ave., Akron, OH (US) 44306; Carey L. Layton, 1445 Virginia Ave., Akron, OH (US) 44306

( * ) Notice: Subject to any disclaimer, the term of this patent is extended or adjusted under 35 U.S.C. 154(b) by 81 days.

(21) Appl. No.: 11/327,716

(22) Filed: Jan. 9, 2006

(51) Int. Cl.
*G05B 19/02* (2006.01)

(52) U.S. Cl. ........................... 368/12; 368/73; 368/250

(58) Field of Classification Search .................. 368/12, 368/73, 250, 13, 72, 74, 251; 455/181.1
See application file for complete search history.

(56) References Cited

U.S. PATENT DOCUMENTS 4,060,973 A * 12/1977 Martino ...................... 368/245
4,430,006 A * 2/1984 Jetter .......................... 368/73
5,764,594 A * 6/1998 Berman et al. ............... 368/12
6,236,622 B1 * 5/2001 Blackman .................... 368/10
6,326,881 B1 * 12/2001 Dahl ....................... 340/309.7
6,606,281 B2 8/2003 Cowgill et al.
6,678,215 B1 1/2004 Treyz et al.
6,795,377 B2 9/2004 Gorden
6,888,779 B2 * 5/2005 Mollicone et al. ............ 368/10
2001/0046852 A1 11/2001 Dorr
2002/0186618 A1 12/2002 Kirkpatrick
2003/0002390 A1 * 1/2003 Sellen et al. .................. 368/12
2003/0095476 A1 * 5/2003 Mollicone et al. .......... 368/250
2003/0198137 A1 10/2003 Gorden
2004/0066710 A1 * 4/2004 Yuen et al. ................... 368/73
2004/0131076 A1 7/2004 Smith
2004/0160337 A1 * 8/2004 Auyang et al. ........ 340/825.24
2004/0242206 A1 12/2004 Dorr
2006/0153007 A1 * 7/2006 Chester ....................... 368/12
2007/0057775 A1 * 3/2007 O'Reilly et al. ............ 340/309

* cited by examiner

*Primary Examiner*—Gary F. Paumen
(74) *Attorney, Agent, or Firm*—John D. Gugliotta, PE, Esq

(57) ABSTRACT

An alarm clock is provide capable of alternately actuating a plurality of visual stimulative and auditor stimulative appliances in a programmable manner such that a variation and randomization of the type of stimulation will be used to prompt the waking of the user.

11 Claims, 4 Drawing Sheets

CLOCK RADIO WITH INTEGRAL DIGITAL MUSIC STORAGE SYSTEM AND INFRARED INTERFACE

RELATED APPLICATIONS

The present invention contains subject matter that was first described in Disclosure Document Registration 575,667 filed on Apr. 21, 2005 under 35 U.S.C. §122 and 37 C.F.R. §1.14. As such, it is respectfully requested that said Disclosure Document remain a permanent part of the file history of the present application and be relied upon during the pending prosecution, and for any other matters that may arise.

There are no previously filed, nor currently any co-pending applications, anywhere in the world.

BACKGROUND OF THE INVENTION

1. Field of the Invention

The present invention relates generally to clock radios, and, more particularly, to a clock radio with integral digital music storage system and infrared interface.

2. Description of the Related Art

The typical clock radio found in bedrooms across the country has progressed very little throughout the years. Only recent high-end models are capable of playing music compact discs (CD's), with the rest only capable of turning on the local FM station at the appropriate time. This is in sharp contrast to other electronic appliances found in the typical household such as computers, audio/visual systems, cellular phones, home automation systems and the like. This is particularly ironic when one considers the important job a clock radio performs. Should the clock radio fail to awaken the user, vary serious consequences can result, such as missed appointments, being late for jobs and school and the like. Accordingly, there is a need for a means by which the performance functionality of clock radios can be advanced with the latest in technologies, while at the same time allow them to perform their task of waking sleeping users better.

A search of the prior art did not disclose any patents that read directly on the claims of the instant invention; however, the following references were considered related.

U.S. Pat. No. 6,606,281 B2, issued in the name of Cowgill et al. discloses a personal audio player with a removable multi-function module.

U.S. Patent Application no. 2004/0131076 A1, published in the name of Smith discloses a method for selectively receiving broadcast data according to one of multiple data configurations.

U.S. Patent Application no. 2004/0242206 A1, published in the name of Dorr discloses a clock radio appliance and method therefor.

U.S. Patent Application no. 2001/0046852 A1, issued in the name of Holland, Jr. discloses a method for receiving messages in an appliance such as a clock radio modified to retrieve messages from a remote computer, converting the retrieved messages into corresponding audio messages, generating a wake up signal, and starting the delivery of the audio messages from a speaker.

U.S. Pat. No. 6,795,377 B2, issued in the name of Gorden discloses a personalized alarm clock which allows a user to receive a predetermined audio and/or image signal, or to place a predetermined telephone call to a selected telephone number at a predetermined time.

U.S. Pat. No. 6,678,215 B1, issued in the name of Treyz et al. discloses an alarm clock radio that handles digital audio files that are downloaded to the alarm clock radio from computing equipment over a communications network.

U.S. Patent Application no. 2002/0186618 A1, published in the name of Kirkpatrick discloses an alarm clock that can be remotely programmed and which is capable of emitting customized alarms obtained via a network such as the Internet™.

U.S. Patent Application no. 2003/0198137 A1, published in the name of Gorden discloses a personalized alarm clock which allows a user to receive a predetermined audio and/or image signal, or to place a predetermined telephone call to a selected telephone number at a predetermined time.

Consequently, a need has been felt for providing a clock radio with integral digital music storage system and infrared interface.

SUMMARY OF THE INVENTION

It is therefore an object of the present invention to provide an improved clock radio.

It is a feature of the present invention to provide an improved clock radio capable of actuating a variety of visually or auditory stimulative appliances via integral infrared interfaces such as to be able to provide programmable variation and randomization of the type of stimulation that will be used to prompt the waking of the user.

Briefly described according to one embodiment of the present invention, an apparatus that provides for the conventional and enhanced features afforded by a digital clock radio is disclosed. Upon initial observation of the present invention, it appears like a conventional clock radio. However, after closer inspection, several enhanced features readily become apparent. First, the present invention has a high capacity digital storage media, envisioned to be a hard drive, coupled with a microphone and a USB port for transfer of digital music such as MP3 files. Additionally, a microphone and microphone input can be accommodated to allow for audio input of voice or custom files. Such files can be played to awaken the user. Secondly, the invention has an infrared transmitter to control external devices or appliances such as television sets, table lamps, or virtually anything that can be controlled by the application or removal of electrical power. Additionally, the ability to provide a telephone control output is provided for calling a 'wake up call' to a conventional land-line telephone or cellular telephone.

The user may select the external light fixture to become activated along with the AM/FM radio, digital media files, microphone inputted voice, buzzer, telephone or the television. The use of alternating, programmed, or random activation of various types of devices creates a non-repetitive stimulation for the user, thereby eliminating the possibility of the user becoming acclimated to, and therefor ignoring, any one particular stimulus.

The use of the present invention provides the user with the ability to be more easily awakened in a more sure and confident manner, while enjoying a wide variety of entertainment sources.

In accordance with a preferred embodiment, a multifunctional alarm clock adapted to perform various functionalities including radio tuner, audible alarm, memory storage capability for downloading and storing MP3 format, and IR transceiver for wirelessly exchanging data to other devices such as lights and TV in order to facilitate illumination and powering thereof.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1-4.

1. Detailed Description of the Figures

Figure 1:
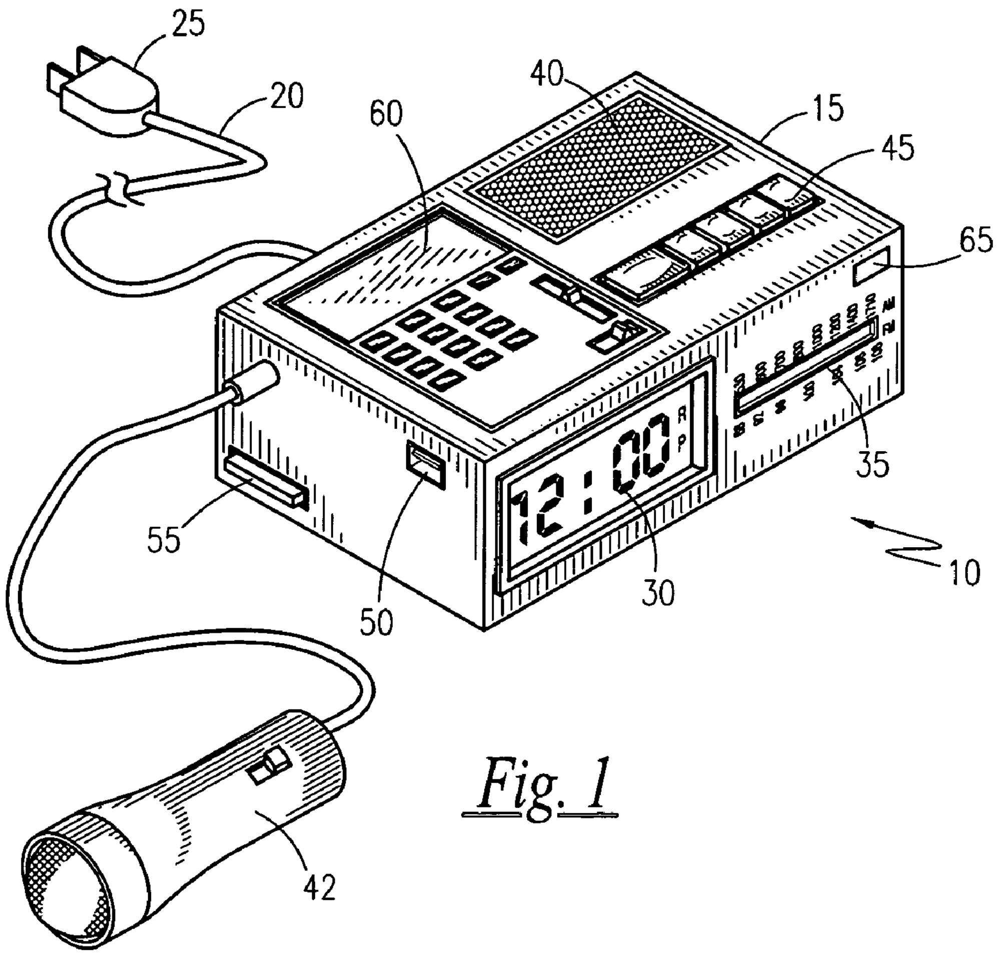
FIG. 1 is an isometric representation of the clock radio with integral digital music storage system and infrared interface 10, according to the preferred embodiment of the present invention.

Referring now to FIG. 1, an isometric representation of the clock radio with integral digital music storage system and infrared interface 10, shown in a utilized state, according to the preferred embodiment of the present invention is disclosed. The clock radio with integral digital music storage system and infrared interface 10 consists of an enclosure 15, envisioned to be made of plastic, which receives electrical power through a power cord 20 and power plug 25. The front or face of the clock radio with integral digital music storage system and infrared interface 10 is provided with a digital time readout 30. Said digital time readout 30 provides visual indicia of actual time, alarm set time, alarm set, AM/PM set time and other such indication as typically found on conventional clock radios. Other conventional clock radio functions such as radio frequency setting dial 35, and a speaker 40, are provided as well. Located atop the enclosure 15, in a prominent position, such that it may be easily accessed by an awakening user, is an alarm/time control panel 45. Said alarm/time control panel 45 provides functional control over the time/alarm functions of the enclosure 15, and is envisioned to provide switches for controlling such items as setting current time, setting dual mode alarm time, snooze functionality, alarm on/off functionality, sleep functionality, and other functions also typically found on a conventional clock radio. Other features not ordinarily associated with a conventional alarm clock are also included. Located on the side of the enclosure 15 is a data input port 50 such as a Universal Serial Bus (USB) port typically found on current technology personal computers. Additional data inputs, such as a microphone 42, also typify the functionality desired by the present invention. Said microphone 42 and/or data input port 50 will allow for the transfer of voice, user generated audio, musical data files, and the like into the clock radio with integral digital music storage system and infrared interface 10 where they are stored upon a digital storage medium 55, such as a hard drive. Said sound files can be stored in a .wav or .mp3 format or other file protocol. Said protocol is limited by current storage technology, and as such, is not intended to be a limiting factor of the present invention. The digital storage medium 55 is envisioned to be of the same format as conventional hard drives, whether internal or portable, used in current technology personal computers and is envisioned to be replaceable or upgradeable by the final user. Located atop the enclosure 15 is a music/remote device control panel 60, which allows access to the music files stored upon the digital storage medium 55, as well as control functionality of remote devices. Anticipated as being of a typical LCD display, any manner of control panel 60 can be used to provide control of remote device occurs by transmission of infrared commands transmitted by an infrared transmitter 65 located on the face of the clock radio with integral digital music storage system and infrared interface 10. Further functionality and description of the music/remote device control panel 60 will occur herein below.

The capability of additional and various control functions are also anticipated in order to accomplish the primary purpose of providing alternate and various audible and visual stimulus as a form of waking alarm. One such option anticipated would be the ability to provide a telephone control output 56, for calling a 'wake up call' to a conventional land-line telephone 58 or cellular telephone (not shown).

Figure 2:
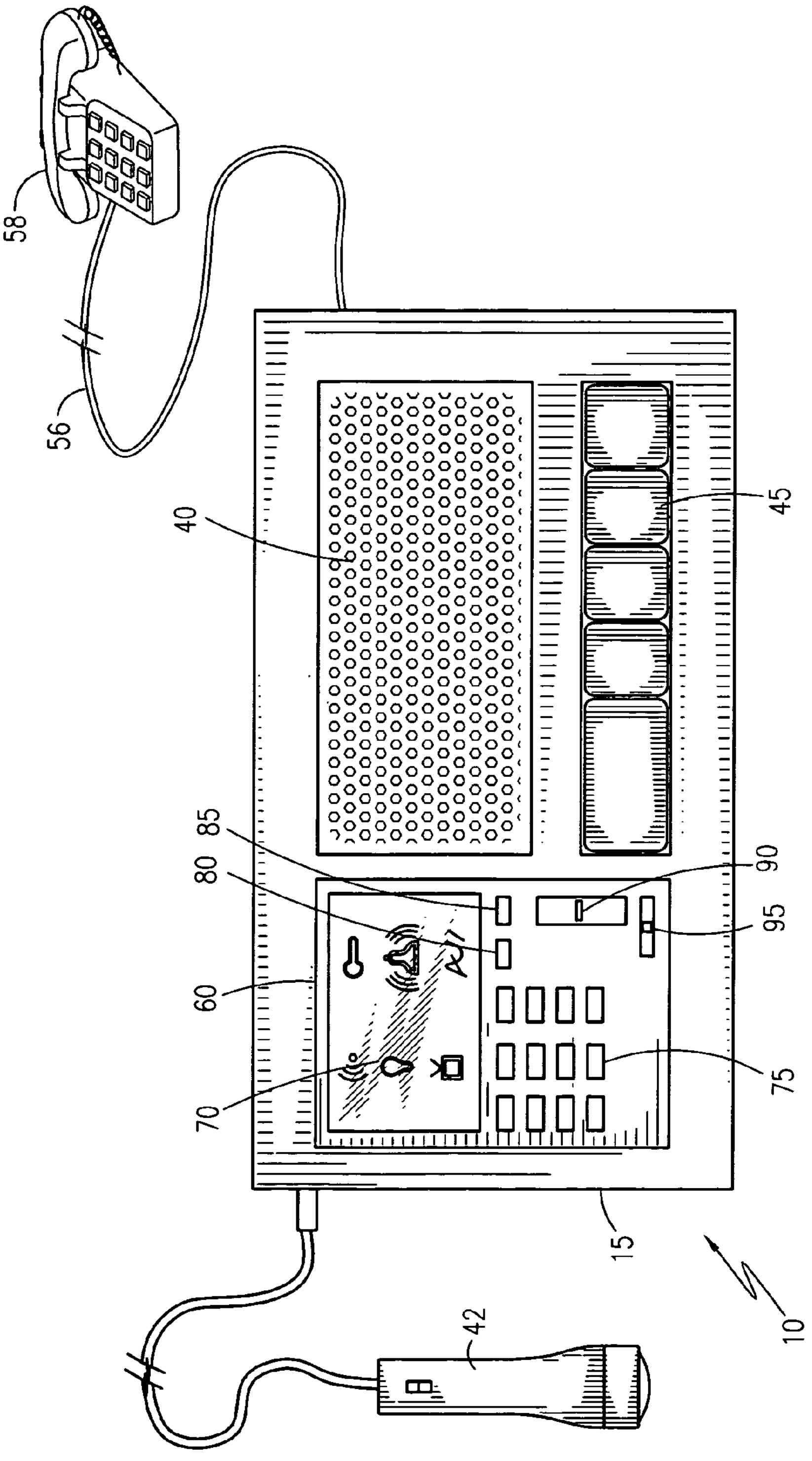
FIG. 2 is a top plan view of the operating controls as found on the clock radio with integral digital music storage system and infrared interface 10, according to the preferred embodiment of the present invention.

Referring now to FIG. 2, a front view of the operating controls as found on the clock radio with integral digital music storage system and infrared interface 10, according to the preferred embodiment of the present invention is shown. Said FIG. provides a clearer view of the speaker 40, the microphone 42, the alarm/time control panel 45 and the music/remote device control panel 60 mounted on the enclosure 15. The music/remote device control panel 60 contains an alphanumeric display 70 which provides visual indicia of such information as music files to be loaded from the data input port 50 (as seen on FIG. 1) to the digital storage medium 55, (as seen on FIG. 1), music files available on the digital storage medium 55 (as seen on FIG. 1), preparation of play lists, selection of play lists to be played upon sleep functionality, selection of play lists to be played upon alarm functionality, selection of infrared devices to be activated or deactivated upon sleep and/or alarm functionality, and the like. A numeric keypad 75 is provided to assist in the selection of such information as music files to be loaded from the data input port 50 (as seen on FIG. 1) to the digital storage medium 55, (as seen on FIG. 1), music files available on the digital storage medium 55 (as seen on FIG. 1), preparation of play lists, selection of play lists to be played upon sleep functionality, selection of play lists to be played upon alarm functionality, selection of infrared devices to be activated or deactivated upon sleep and/or alarm functionality, and the like. The numeric keypad 75 works in conjunction with an enter button 80 and a select button 85 in a customary manner. Also located on the music/remote device control panel 60 is a select button 85, which allows for the selection of the appropriate device that will awaken the user at the pre-set time. Such selection is envisioned to include but not be limited to the AM/FM radio, an internal buzzer, internally stored music or recorded voice files stored on the digital storage medium 55 (as seen in FIG. 1), or on an external television set as that would be controlled from the infrared transmitter 65 (as seen in FIG. 1). Finally a light control activation switch 95 is provided to allow for control of an external device such as a table lamp. It is anticipated that conventionally available, individual controllers can be utilized in conjunction with the present invention. By way of example, and not as a limitation, General Electric currently provides lamp wall switch kits (model 51138) or other appliance control kits (model 51151) that can be used to connect lights and appliances to individual outlets adapts or even screw in socket adapters. When the light control activation switch 95 is in the "ON" position, the external device such as a table lamp will activate when the awaken time is reached. When the light control activation switch 95 is in the "OFF" position, the external device such as the table lamp will remain deactivated when the awaken time is reached. Such functionality is envisioned to be useful when other individuals such a spouse is still sleeping.

Figure 3:
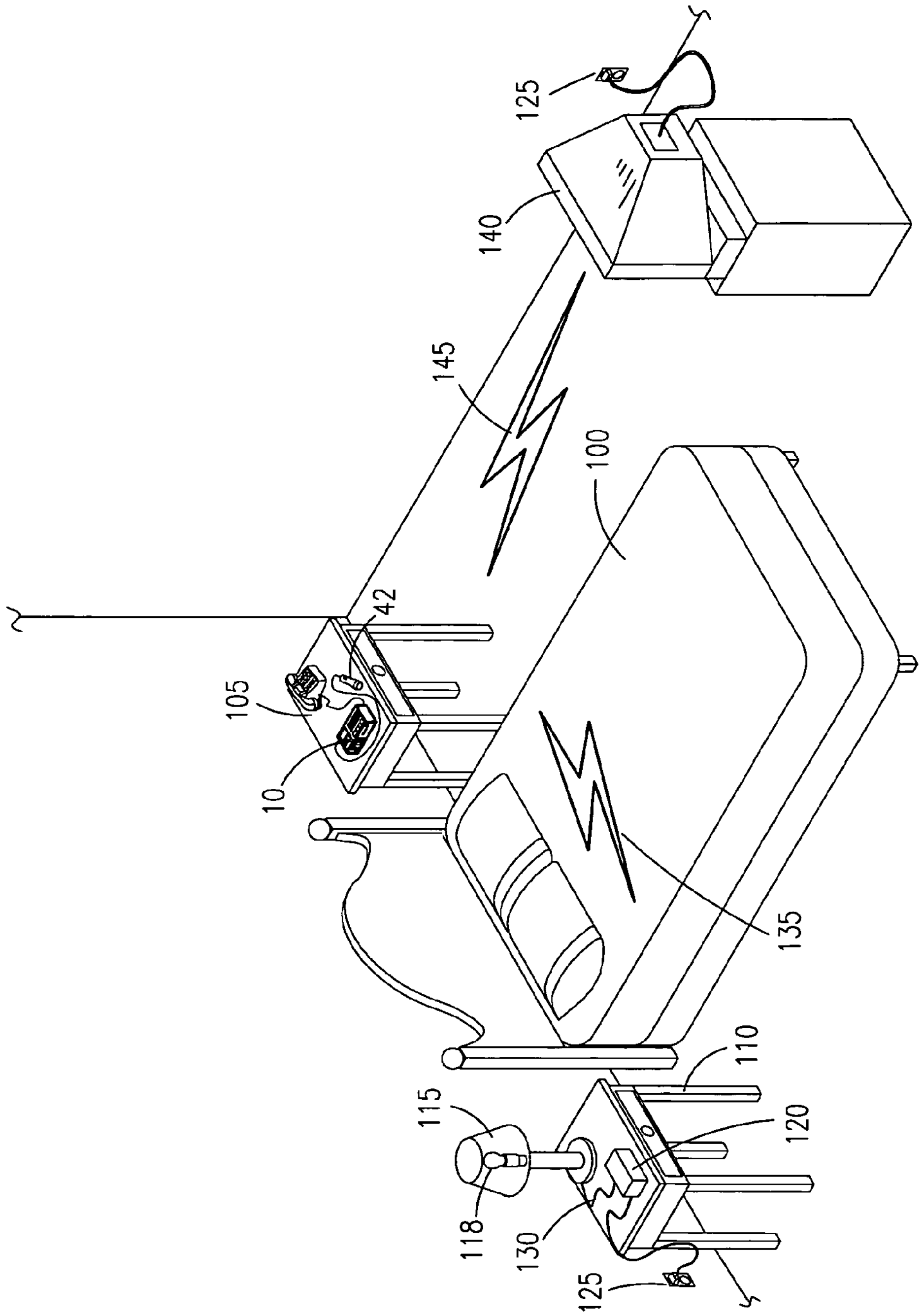
FIG. 3 is a perspective view of the clock radio with integral digital music storage system and infrared interface 10, shown in a typical bedroom environment shown interfacing with other controlled devices; and, FIG. 4 is an electrical block diagram of the clock radio with integral digital music storage system and infrared interface 10, depicting major internal control elements.

Referring next to FIG. 3, a perspective view of the clock radio with integral digital music storage system and infrared interface 10, shown in a typical bedroom environment shown interfacing with other controlled devices is depicted. A typical bedroom environment containing a bed 100 bordered by a first nightstand 105 and a second nightstand 110 is provided. The clock radio with integral digital music storage system and infrared interface 10 is provided on the first nightstand 105 while a table lamp 115 is provided on the second nightstand 110. The table lamp 115 can be controlled by an infrared control panel 118 of the type that connects directly to the socket, or can be controlled by an individual appliance infrared control panel 120, each of the type that can be propriety or interfaced with those conventionally available devices as described above. The infrared control panel 120 is plugged into a conventional AC wall outlet 125, and the table lamp power cord 130 of the conventional AC wall outlet 125 is plugged into the infrared control panel 120. The infrared control panel 120 provides a simple relay interface that applies AC power upon receipt of a matching infrared signal, which is well-known in the art. The infrared control panel 120 supplies and removes a closed circuit upon receipt of a first infrared signal 135. Also located in the bedroom environment is a television 140 that is connected to a conventional AC wall outlet 125. The television 140 is controlled by a second infrared signal 145 in a typical manner as a conventional remote control would control the television 140. The clock radio with integral digital music storage system and infrared interface 10 would be capable of programming a wide variety of television 140 via use of the music/remote device control panel 60 (as shown in FIGS. 1 and 2) in much the same manner as a universal remote control is programmed.

Figure 4:
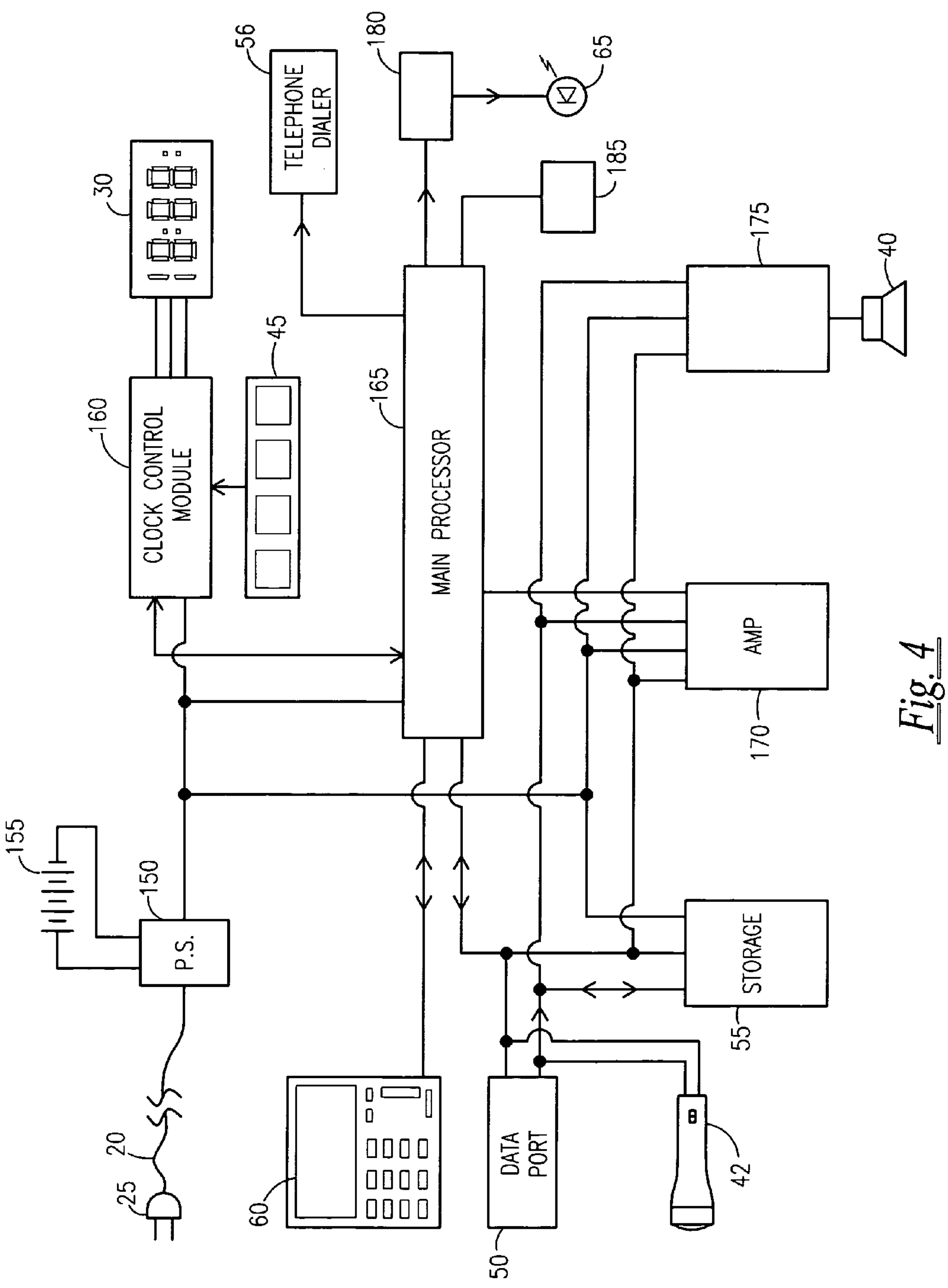

Referring finally to FIG. 4, an electrical block diagram of the clock radio with integral digital music storage system and infrared interface 10, depicting major internal control elements is disclosed. Electrical power from the power plug 25 and the power cord 20 is routed through a power supply 150, which receives backup power from a backup battery 155 in the event of a power failure. Regulated output power is routed to a clock control module 160 which provides the timekeeping and alarm functions of the clock radio with integral digital music storage system and infrared interface 10. Such timekeeping and alarm functionality is well-known in the art and not within the scope of the current invention. The clock control module 160 drives the digital time readout 30 based upon initial command functions from the alarm/time control panel 45. The clock control module 160 also provides timekeeping and alarm functionality to a main processor 165. Said main processor 165 provides command and control functionality to a main processor 165, and is envisioned to be a microcontroller, such as a basic stamp module, a small programmable logic controller or the like. The main processor 165 receives and transmits user commands to the music/remote device control panel 60 in much the same manner as a mimic panel on a controller. Upon receipt of the appropriate commands, the main processor 165 will route the appropriate audio signals, either digital or analog, from the digital storage medium 55, or from an AM/FM radio tuner 170 to an amplifier 175. The amplifier 175 provides a high level analog audio signal to the speaker 40, which operates in a well-known conventional manner. Additionally, the main processor 165 governs the transfer of music files from the data input port 50 or the microphone 42 to the digital storage medium 55. The main processor 165 provides infrared commands through an infrared driver 180 to the infrared transmitter 65. Finally, the main processor 165 provides an electrical signal to a buzzer 185 should that mode of awakening be selected by the music/remote device control panel 60.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. Upon initial purchase or acquisition of the clock radio with integral digital music storage system and infrared interface 10, the user would set the current time along with the desired awakening time on the alarm/time control panel 45, using the digital time readout 30 for verification purposes. At this same time, the user would set the mode of awakening using the music/remote device control panel 60 to select either the buzzer 185, the AM/FM radio tuner 170, the digital storage medium 55 or an external device such as a television 140. The user would also select whether or not the an external table lamp 115 by use of the light control activation switch 95. Finally the user would load in wanted music files on the digital storage medium 55 using the music/remote device control panel 60 in conjunction with the data input port 50. Should such music files be desired to awaken by, the associated play list would be selected on the music/remote device control panel 60. At this point in time, the clock radio with integral digital music storage system and infrared interface 10 would be ready for use.

More advanced programming and techniques are also envisioned. For example, the user can shuffle or provide for a random output of different types of stimulus (audible: radio, television, voice, music, etc.; or visual: lights, television, etc.) By providing the ability to make the alarm output unpredictable, the user will not become acclimated to one particular stimulus, and therefor will be unlikely to ignore that stimulus over time.

At the appropriate awakening time, the clock control module 160 will send an enabling command to the main processor 165, upon which the main processor 165 will activate the digital storage medium 55, the AM/FM radio tuner 170, the buzzer 185, or activate the television 140, through the infrared driver 180 and music/remote device control panel 60, dependent on the position of the device selection switch 90. Additionally, the infrared driver 180 and music/remote device control panel 60 will activate a table lamp 115, or similar apparatus, through the use of an infrared control panel 120. The user at this point can reset the alarm functions of the clock control module 160 or enable a sleep function, both through appropriate switches on the alarm/time control panel 45. As an additional feature, the user can utilize the clock radio with integral digital music storage system and infrared interface 10 as an entertainment device by listening to stored music on the digital storage medium 55 at any time during the day, along with listening to the AM/FM radio tuner 170. The clock radio with integral digital music storage system and infrared interface 10 will reset all functionality on a daily basis in the same manner as a conventional alarm clock.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. In an alarm clock, wherein the improvement comprises the capability of alternately actuating a plurality of visual stimulative and auditor stimulative appliances in a programmable manner such that a variation and randomization of the type of stimulation will be used to prompt the waking of the user.

2. In the alarm clock of claim 1, wherein the improvement further comprises infrared communication means for communicating between said alarm clock and at least one said appliance.

3. An alarming apparatus comprising:

a digital alarm clock radio;

a USB port for transfer of digital information;

a high capacity digital storage media in communication with said USB port for receiving and storing said digital information; and at least one infrared transmitter to control external devices.

4. The alarming apparatus of claim 3, wherein said high capacity digital storage media is removable.

5. The alarming apparatus of claim 3, further comprising a microphone and microphone input in communication with said digital storage media;

wherein said alarm clock can be accommodated to allow for audio input of voice or custom files that can be played to awaken the user.

6. The alarming apparatus of claim 3, wherein said appliances are selected from the group comprising: television sets; table lamps; and light fixtures.

7. The alarming apparatus of claim 3, further comprising a telephone control output capable of calling a 'wake up call' to a conventional land-line telephone or cellular telephone.

8. The alarming apparatus of claim 5, wherein said appliances are selected from the group comprising: television sets; table lamps; and light fixtures.

9. The alarming apparatus of claim 8, further comprising a telephone control output capable of calling a 'wake up call' to a conventional land-line telephone or cellular telephone.

10. The alarming apparatus of claim 9, wherein the user may select the device to be activated for an alarm, wherein further said alarm can be programmed as a random activation of various types of devices such as to create a non-repetitive stimulation for the user, thereby eliminating the possibility of the user becoming acclimated to, and therefor ignoring, any one particular stimulus.

11. A method for alarming a sleeping user for purposes of waking said user, said method comprising the steps of alternately actuating a plurality of visual stimulative and auditor stimulative appliances in a programmable manner such that a variation and randomization of the type of stimulation will be used to prompt the waking of the user.

* * * * *